United States Patent [19]
Cottam

[11] Patent Number: 6,049,695
[45] Date of Patent: Apr. 11, 2000

[54] METHOD AND SYSTEM FOR DETECTING UNAUTHORIZED UTILIZATION OF A CABLE TELEVISION DECODER

[76] Inventor: John L. Cottam, 2308 La Vida Pl., Collin County, Plano, Tex. 75023

[21] Appl. No.: 08/995,805

[22] Filed: Dec. 22, 1997

[51] Int. Cl.[7] .................................................. H04N 7/16
[52] U.S. Cl. .............................. 455/6.2; 455/2; 348/5.5; 348/1; 348/10
[58] Field of Search .................................. 345/327; 348/1, 348/2, 5.5, 10, 6, 7, 12, 13, 554, 555, 725, 730; 455/2, 6.2, 6.3, 3.1, 3.2, 4.1, 4.2, 5.1, 6.1; 380/5, 10, 15, 20; H04N 7/16, 7/173

[56] References Cited

U.S. PATENT DOCUMENTS

| | | |
|---|---|---|
| 4,577,220 | 3/1986 | Laxton et al. ........................ 455/2 |
| 4,723,302 | 2/1988 | Fulmer et al. ........................ 455/2 |
| 5,978,649 | 11/1999 | Kahn ................................. 348/10 |

*Primary Examiner*—Chris Grant
*Attorney, Agent, or Firm*—Lisa L.B. Yociss

[57] ABSTRACT

A method and system for detecting unauthorized utilization of a cable television decoder. The decoder is utilized to receive cable television signals. The decoder is one of a plurality of receivers of different types. A local oscillator frequency being utilized by the decoder to receive the channel is determined. A type is then determined for the decoder utilizing the determined local oscillator frequency. The channel being received is also determined utilizing the determined local oscillator frequency. In response to the determination of type of decoder and channel being received, a determination is made whether receipt of the channel is authorized for this decoder.

16 Claims, 4 Drawing Sheets

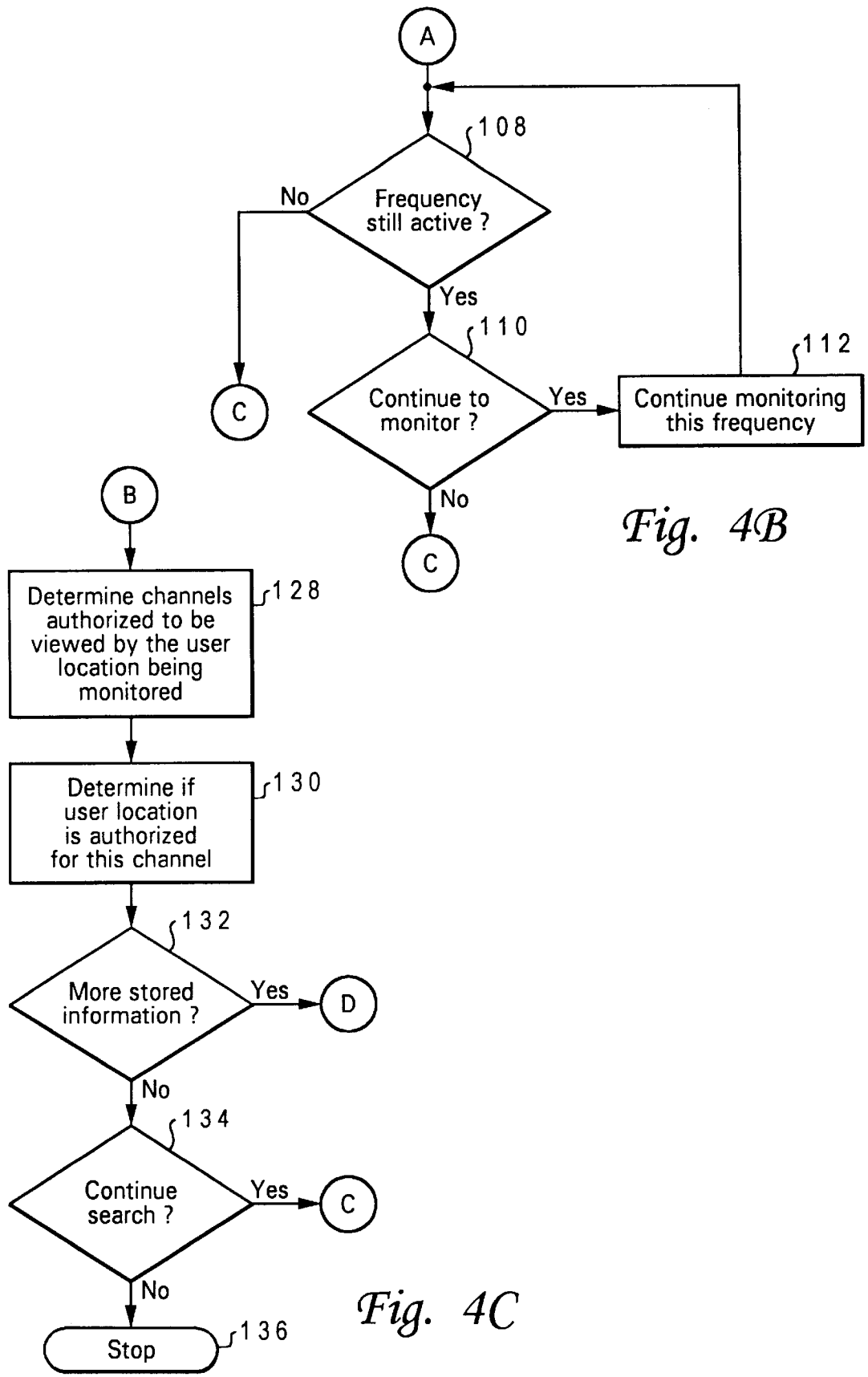

METHOD AND SYSTEM FOR DETECTING UNAUTHORIZED UTILIZATION OF A CABLE TELEVISION DECODER

BACKGROUND OF THE INVENTION

1. Technical Field

The present invention relates to cable television decoders, and in particular to a method and system for detecting unauthorized utilization of cable television decoders. Still more particularly, the present invention relates to detecting unauthorized utilization of a cable television decoder by determining a local oscillator frequency of the decoder, and determining whether the decoder is authorized to receive a particular cable television channel associated with the determined local oscillator frequency.

2. Description of the Related Art

Cable television decoders are utilized to receive both cable and regular broadcast television signals. Cable television signals are typically encoded utilizing a predetermined scrambling technique. A decoder is coupled to a user's television and is designed to receive and decode the scrambled signal. Once the signal is decoded, it is transmitted to the television where it is presented to the user.

A television is capable of receiving a regular broadcast signal utilizing a receiver which includes a local oscillator. The local oscillator is tuned by a user to one of a variety of channel frequencies associated with the television channel the user desires to watch. When the user has paid for cable service, the television is typically permanently set to one channel, often channel 2 or 3. The television is then coupled to a decoder supplied by the cable provider. The decoder, instead of the television, is then tuned, utilizing the decoder's local oscillator, to a channel frequency associated with the cable television channel the user desires to watch. The signal input to the decoder is provided by the cable television provider via a cable coupled to the decoder.

Many different types of decoders are available. Each type of decoder utilizes a different local oscillator frequency for each channel. For example, channel 2 may be associated with a local oscillator frequency of 650.125 MHz for one decoder and with a local oscillator frequency of 650.250 MHz for a second decoder.

SUMMARY OF THE INVENTION

A method and system are disclosed for detecting unauthorized utilization of a cable television decoder. The decoder is utilized to receive cable television signals. The decoder is one of a plurality of receivers of different types. A local oscillator frequency being utilized by the decoder to receive the channel is determined. A type is then determined for the decoder utilizing the determined local oscillator frequency. The channel being received is also determined utilizing the determined local oscillator frequency. In response to the determination of type of decoder and channel being received, a determination is made whether receipt of the channel is authorized for this decoder.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of a preferred embodiment when read in conjunction with the accompanying drawings, wherein:

FIG. 3 is a high level flow chart depicting a creation of decoder files which include an association of channel frequencies with a particular type of decoder in accordance with the present invention; and FIGS. 4A–4D is a high level flow chart illustrating a determination of unauthorized utilization of a decoder in accordance with the present invention.

DETAILED DESCRIPTION OF PREFERRED EMBODIMENT

A preferred embodiment of the present invention and its advantages are better understood by referring to FIGS. 1–4D of the drawings, like numerals being used for like and corresponding parts of the accompanying drawings.

Figure 1:
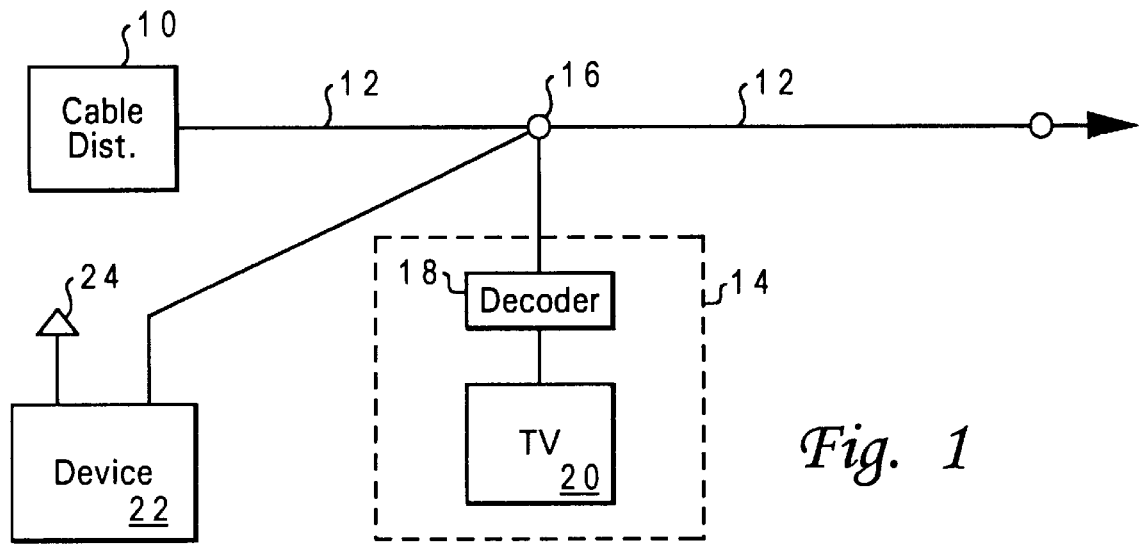
FIG. 1 is a block diagram of a cable provider's distribution station, a user's television and decoder, and a device for detecting unauthorized utilization of the decoder in accordance with the present invention.

FIG. 1 is a block diagram of a cable provider's distribution station, a user's television and decoder, and a device for detecting unauthorized utilization of the decoder in accordance with the present invention.

A user may select to receive a cable television signal which typically includes both regular broadcast television channels as well as additional cable channels. The user may further select to receive one or more premium channels. For example, a cable provider may offer major regular broadcast channels, such as an NBC, a CBS, and an ABC affiliate stations. In addition to these channels, the cable provider will typically offer a package of basic cable channels. The regular broadcast channels and basic cable channels are offered at a basic cable rate. The user may further choose a premium channel, such as HBO. The user is typically charged a premium rate for the regular channels, basic cable channels, and premium channels. In this manner, each cable subscriber is authorized to receive a particular group of channels.

The cable provider distributes all available channels to all cable subscribers. The signals associated with these channels are typically scrambled to prevent unauthorized viewing of these channels. The cable provider then may provide a decoder which is preprogrammed to decode, or unscramble, the signals the particular subscriber is authorized to view. When a user attempts to tune to a channel the user is not authorized to view, for example channel 14 which is associated with the HBO channel for this cable provider, the decoder will not allow tuning to channel 14. Instead, the decoder will default to a predetermined channel, such as channel 2. In this manner, the user is prohibited from viewing the premium channel.

Cable distribution station 10 distributes signals via cable 12 to subscribers. A subscriber 14 is coupled to cable 12 via a tap port 16 utilizing a two-way splitter 1000 MHz to 650 MHz which is commercially available. Subscriber 14 receives signals from cable 12 into decoder 18 which is preprogrammed to receive channels subscriber 14 is authorized to view on television 20. Decoder 18 is one of a plurality of different types of commercially available decoders. These decoders are receivers which use a local oscillator to tune to various channels. In this manner, television 20 is permanently tuned to a predetermined channel, such as channel 3. A user then tunes a local oscillator included within decoder 18 in order to receive the different channels.

It is possible to modify a decoder to receive an unauthorized channel. For example, a user may receive a premium channel for which the user has not paid by modifying the decoder to receive this channel. If the decoder has been modified, the decoder will be able to be tuned to the premium channel and will not default to a predetermined channel. The user may then view the unauthorized channel.

Device 22 may be utilized to detect unauthorized use of a decoder. Device 22 accesses a decoder for a particular subscriber either by being physically coupled to tap port 16 or by receiving signals via antenna 24.

Antenna 24 is preferably a UHF broadband Yagi antenna having a 400 MHz bandwidth and a relatively constant gain of typically 6 dB over the frequency range.

Figure 2:
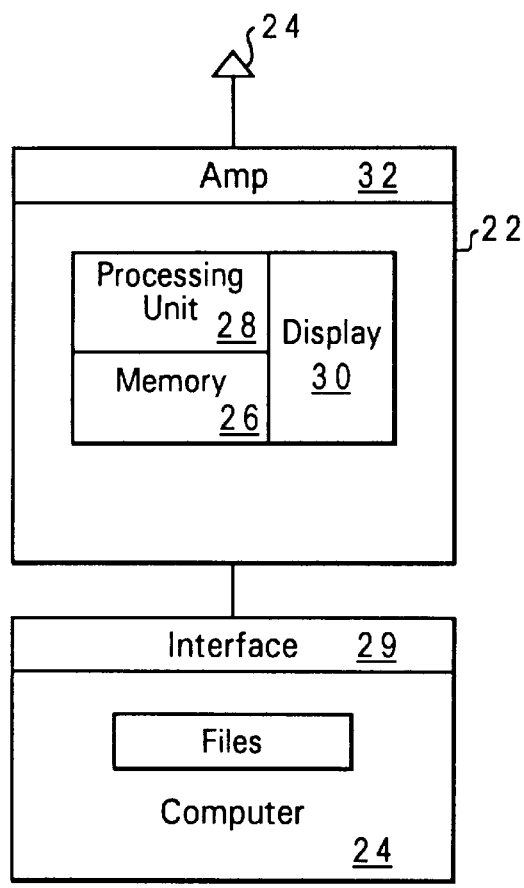
FIG. 2 is a high level block diagram of the device of FIG. 1 for detecting unauthorized utilization of a decoder in accordance with the present invention.

FIG. 2 is a high level block diagram of device 22 of FIG. 1 for detecting unauthorized utilization of decoder 18 in accordance with the present invention.

A computer 24 is utilized to download decoder files into memory 26 of device 22 utilizing interface 29. Computer 24 is preferably any type of IBM compatible personal computer. Interface 29 is preferably a CAT-232C Serial Interface available from Computer Aided Technologies, Shreveport, La. A decoder file is associated with a particular decoder and includes a listing of all channels and their associated local oscillator frequencies. Those skilled in the art will recognize that other methods for storing each channel and its associated local oscillator frequency for each decoder may be utilized. However, in the preferred embodiment, each different type of decoder is associated with a separate file stored in device 22. Once the files are stored in device 22, device 22 may be disconnected from computer 24 in order to be portable to a subscriber's physical location.

Device 22 includes a processing unit 28, a display 30, and an amplifier 32. Device 22 may preferably be implemented utilizing a model AR 8000 manufactured by ADR, LTD which has a business address of 2-4-6 Misuji, Taito-Ku, Tokyo Japan, and a business telephone number of 03 3865 1681. The AR 8000 may be purchased from the manufacturer modified from its typical settings to be able to access all frequencies in a frequency modulation mode from 500 KHz to 1900 MHz in the following frequency step sizes: 50, 100, and 500 Hz; and 1, 2, 5, 6.25, 9, 10, 12.5, 20, 25, 30, 50, 100, 200, 250, and 500 KHz.

Figures 3, 4D:
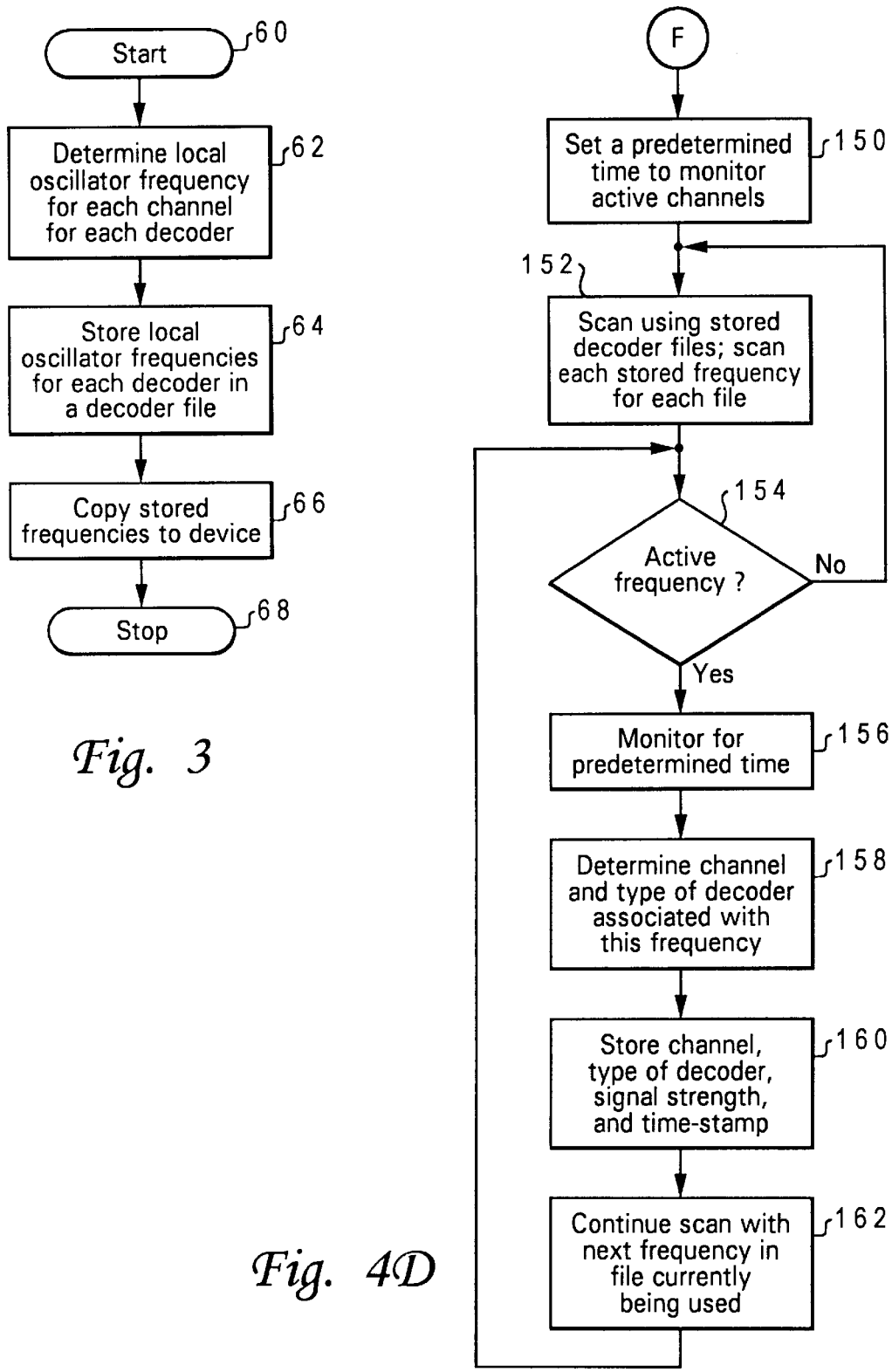
Figure 4A:
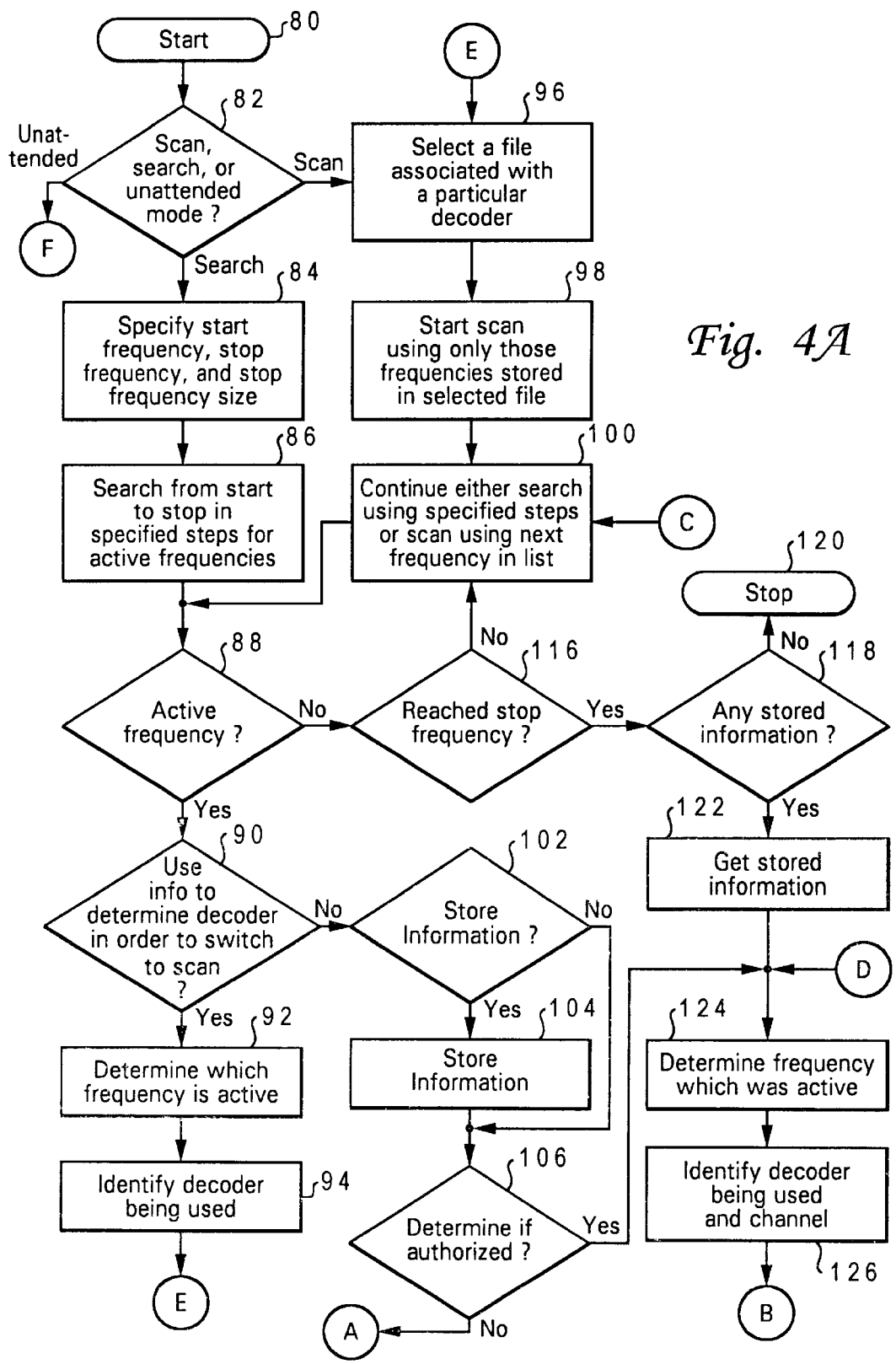

FIG. 3 is a high level flow chart depicting a creation of decoder files which include an association of channel frequencies with a particular decoder in accordance with the present invention. The process starts as depicted at block 60 and thereafter passes to block 62 which illustrates the determination of a local oscillator frequency for each channel. This determination is performed for each decoder. For example, in the preferred embodiment, device 22 may store up to 50 different frequencies for each of up to 20 different decoders. Next, block 64 depicts the storage of these local oscillator frequencies in a separate decoder file for each decoder. Thereafter, block 66 illustrates the copying of the stored files into device 22. The process then terminates as illustrated at block 68.

FIGS. 4A–4D together is a high level flow chart illustrating a determination of unauthorized utilization of a decoder in accordance with the present invention. The process starts as depicted at block 80 and thereafter passes to block 82 which illustrates a determination of whether a Search, a Scan, or an Unattended function is to be performed.

A decoder's local oscillator is accessed in a manner well known in the art to determine if the local oscillator is tuned to a particular frequency.

In accordance with the present invention, in a search function, a start frequency, a stop frequency, and the step frequency are determined and specified by a user of device 22. Device 22 searches starting at the Start frequency and determines if the decoder's local oscillator is currently tuned to that frequency. Thereafter, device 22 monitors each frequency between the Start and the Stop frequencies in the incremental frequency step specified by the user, and determines for each frequency if the decoder is tuned to that frequency. For example, a user may specify a start frequency of 500 KHz and a stop frequency of 1900 MHz with a step of 50 Hz. Device 22 will then determine if the decoder is tuned to any of the frequencies between 500 Hz and 1900 MHz using 50 Hz step, i.e. 500 Hz, 550 Hz, 600 Hz, 650 Hz, etc.

For a scan function, a file associated with a particular decoder is determined. In the file is stored each frequency which is associated with each channel for the decoder. Only the frequencies stored in the file are utilized when the decoder is monitored. Therefore, each frequency listed in the file is monitored to determine if the decoder is currently tuned to that frequency. Because a smaller number of frequencies are monitored during the scan function, the scan function is typically performed must faster than a search function.

Referring again to block 82, if a determination is made that a search function is to be performed, the process passes to block 84. If a determination is made that a scan function is to be performed, the process passes to block 96. If a determination is made that an unattended function is to be performed, the process passes to block 150.

Block 84 illustrates the specification of a start frequency, a stop frequency, and a step frequency size. Next, block 86 depicts the searching from the start frequency to the stop frequency in the specified step size. Thereafter, block 88 illustrates a determination of whether or not the current frequency is an active frequency. An active frequency is the one to which the decoder's local oscillator is currently tuned. If a determination is made that an active frequency has been found, the process passes to block 90 which illustrates a determination of whether or not the active frequency information is to be used in order to switch from the search function to the scan function. If a determination is made that device 22 is to be switched to a scan function, the process passes to block 92 which depicts a determination of which frequency is active. Thereafter, block 94 depicts an identification of which decoder is being used by comparing the active frequency with all frequencies stored in each decoder file. Because all decoders use a slightly different local oscillator frequency for each channel, the active frequency will be found only once in all of the stored frequencies. A determination is then made regarding in which file the active frequency is found. Thereafter, the decoder associated with the file can be determined. The process then passes to block 96.

Block 96 depicts the selection of a file associated with a particular decoder to be utilized during the scan. Next, block 98 illustrates starting the scan using only those frequencies stored in the selected file. The search or scan is continued through each frequency as depicted by block 100 using either the next frequency stored in the file for a scan, or the next frequency step during a search.

Referring again to block 90, if a determination is made that the information is not to be used to switch to a scan function, the process passes to block 102 which depicts a determination of whether or not the active frequency information is to be stored. If a determination is made that the active frequency information is to be stored, the process passes to block 104 which illustrates the storage of the information in memory 26. Thereafter, the process passes to block 106. Referring again to block 102, if a determination is made that the information is not to be stored, the process passes to block 106.

Block 106 depicts a determination of whether or not a determination is to be made regarding whether the user is authorized to receive the channel associated with the active frequency. If a determination is made that an authorization determination is to be made, the process passes to block 124. Referring again to block 106, if an authorization determination is not to be made, the process passes to block 108 which illustrates a determination of whether or not this frequency is still active. If a determination is made that this frequency is not still active, the process passes to block 100.

Referring again to block 108, if a determination is made that the frequency is still active, the process passes to block 110 which illustrates a determination of whether or not to continue monitoring this frequency. If a determination is made to continue monitoring this frequency, the process passes to block 112 which depicts the continuation of the monitoring of this frequency. The process then passes back to block 108. Referring again to block 110, if a determination is made to stop monitoring, the process passes to back to block 100.

Referring again to block 88, if a determination is made that the current frequency is not an active frequency, the process passes to block 116 which illustrates a determination of whether or not the stop frequency or the last frequency has been reached. If a determination is made that neither the stop nor last frequency has been reached, the process passes back to block 100. Referring again to block 116, if a determination is made that either the stop or last frequency has been reached, the process passes to block 118. Block 118 illustrates a determination of whether or not any information has been stored. If a determination is made that no information has been stored, the process terminates as depicted at block 120.

Referring again to block 118, if a determination is made that information has been stored, the process passes to block 122 which illustrates the getting of the stored information. Next, block 124 depicts a determination of the frequency which was active. Thereafter, block 126 illustrates the identification of the decoder being used.

The decoder is identified by searching all local frequencies stored for each type of decoder. The active local oscillator frequency will be found only once in the stored frequencies for all decoders. Therefore, once the active local oscillator frequency is found, the decoder associated with that frequency can be determined. The channel is also determined utilizing the active local oscillator frequency. The frequency will be associated with only one channel for this particular type of decoder.

For example, for a decoder type A, the local oscillator frequencies for channels 2–50 may be stored. Each stored local oscillator frequency for decoder A, therefore, is associated with a different one of the channels. As an example, decoder A may be associated with a local oscillator frequency of 650.025 MHz for channel 2. For a decoder type B, the local oscillator frequencies for channels 2–50 may also be stored. Each stored local oscillator frequency for decoder B, therefore, is associated with a different one of the channels. For decoder B, a local oscillator frequency of 650.050 MHz may be associated with channel 2. Therefore, if an active local oscillator frequency of 650.025 is determined, a determination may be made that a decoder type A is being utilized to receive channel 2.

Block 128 depicts a determination of the channels which are authorized to be viewed by the user location being monitored. The user is authorized to view those channels which are included in the channel package purchased by the user and may include premium channels.

Block 130 then depicts determining whether the user location is authorized for the channel associated with the active frequency. The process then passes to block 132 which illustrates a determination of whether or not there is more stored information. If a determination is made that there is more stored information, the process passes to block 124. Referring again to block 132, if a determination is made that there is no more stored information, the process passes to block 134 which depicts a determination of whether or not to continue the search/scan. If a determination is made that the search/scan is to be continued, the process passes to block 100. Referring again to block 134, if a determination is made to stop the search/scan, the process terminates as depicted at block 136.

Referring again to block 150, when an unattended function is to be performed, a predetermined time is set during which to monitor any active channels which are found Block 152 illustrates starting a scan function as described above using the stored decoder files. During the unattended function, device 22 is physically coupled to tap port 16 and may be left unattended. Each frequency stored in each decoder file is utilized during the scan in order to determine if any of there is activity on any of these stored frequencies. Next, block 154 depicts a determination of whether or not the frequency currently being monitored is active. If a determination is made that the current frequency being monitored is not active, the process passes back to block 152 and the scan continues using the next listed frequency. The scan continues through each frequency in each decoder file.

Referring again to block 154, if a determination is made that the current frequency being monitored is active, the process passes to block 156 which illustrates the monitoring of this frequency for the predetermined amount of time. Thereafter, block 158 depicts a determination of the channel and type of decoder which is associated with this frequency as described above. Next, block 160 illustrates the storage of the channel, type of decoder, signal strength, and time-stamp for this signal. Block 162, then, depicts the continuation of the scan utilizing the next frequency included within the file currently being utilized. The process then passes back to block 154.

Therefore, in the unattended mode, device 22 continues to scan only those frequencies associated with channels for decoders for which a file is stored in device 22. Device 22 will then maintain a log for a particular user location of each channel viewed, as well as the approximate length of time the channel is viewed.

While the invention has been particularly shown and described with reference to a preferred embodiment, it will be understood by those skilled in the art that various changes in form and detail may be made therein without departing from the spirit and scope of the invention.

What is claimed is:

1. A method for identifying a type of one of a plurality of receivers of different types, said one of said plurality of receivers being utilized to receive one of a plurality of cable television channels, said method comprising the steps of:

determining a local oscillator frequency being utilized by said one of said plurality of receivers utilized to receive said one of said plurality of channels; and determining a type of said one of said plurality of receivers utilizing said determined local oscillator frequency.

2. The method according to claim 1, further comprising the steps of:

determining said one of said plurality of channels utilizing said determined local oscillator frequency and said determined type of said one of said plurality of receivers.

3. The method according to claim 2 further comprising the step of determining if use of said one of said plurality of receivers is authorized for receipt of said one of said plurality of channels.

4. The method according to claim 3 further comprising the steps of:

each type of said plurality of receivers receiving a plurality of channels;

for each type of said plurality of receivers, associating a different local oscillator frequency with each of said plurality of channels received by said type of said plurality of receivers; and storing said associated different local oscillator frequencies for each type of said plurality of receivers.

5. The method according to claim 4 wherein said step of determining a type of said one of said plurality of receivers further comprises the steps of:

in response to said determination of said local oscillator frequency being utilized by said one of said plurality of receivers, comparing said determined local oscillator frequency with each stored local oscillator frequency stored for each of said plurality of receivers; and in response to one of said stored local oscillator frequencies being approximately equal to said determined local oscillator frequency, determining said type of said one of said plurality of receivers.

6. The method according to claim 5 wherein said step of determining if use of said one of said plurality of receivers is authorized for receipt of said one of said plurality of channels further comprises the steps of:

comparing said one of said plurality of channels with a plurality of channels authorized for said one of said plurality of receivers to be received;

in response to said comparison, if said one of said plurality of channels is included within said plurality of channels authorized to be received, determining that use of said one of said plurality of receivers is authorized for receipt of said one of said plurality of channels; and in response to said comparison, if said one of said plurality of channels is not included within said plurality of channels authorized to be received, determining that use of said one of said plurality of receivers is not authorized for receipt of said one of said plurality of channels.

7. The method according to claim 6 wherein said step of determining a local oscillator frequency being utilized by said one of said plurality of receiver further includes the steps of:

specifying a start frequency, a stop frequency, and a step frequency size;

searching each frequency beginning with said start frequency through said stop frequency in said step frequency size until an active frequency is located; and in response to locating an active frequency, determining said active frequency as said local oscillator frequency.

8. The method according to claim 7 further including the step of continuing to monitor said one of said plurality of receivers by continuing to search for an active frequency utilizing only said plurality of local oscillator frequencies associated with said determined type of said one of said plurality of receivers.

9. A device for identifying a type of one of a plurality of receivers of different types, said one of said plurality of receivers being utilized to receive one of a plurality of cable television channels, comprising:

means for determining a local oscillator frequency being utilized by said one of said plurality of receivers utilized to receive said one of said plurality of channels; and means for determining a type of said one of said plurality of receivers utilizing said determined local oscillator frequency.

10. The device according to claim 9, further comprising:

means for determining said one of said plurality of channels utilizing said determined local oscillator frequency and said determined type of said one of said plurality of receivers.

11. The device according to claim 10 further comprising means for determining if use of said one of said plurality of receivers is authorized for receipt of said one of said plurality of channels.

12. The device according to claim 11 further comprising:

means for each type of said plurality of receivers receiving a plurality of channels;

means for each type of said plurality of receivers, for associating a different local oscillator frequency with each of said plurality of channels received by said type of said plurality of receivers; and means for storing said associated different local oscillator frequencies for each type of said plurality of receivers.

13. The device according to claim 12 wherein said means for determining a type of said one of said plurality of receivers further comprises:

means responsive to said determination of said local oscillator frequency being utilized by said one of said plurality of receivers, for comparing said determined local oscillator frequency with each stored local oscillator frequency stored for each of said plurality of receivers; and means responsive to one of said stored local oscillator frequencies being approximately equal to said determined local oscillator frequency, for determining said type of said one of said plurality of receivers.

14. The device according to claim 13 wherein said means for determining if use of said one of said plurality of receivers is authorized for receipt of said one of said plurality of channels further comprises:

means for comparing said one of said plurality of channels with a plurality of channels authorized for said one of said plurality of receivers to be received;

means responsive to said comparison, for if said one of said plurality of channels is included within said plurality of channels authorized to be received, determining that use of said one of said plurality of receivers is authorized for receipt of said one of said plurality of channels; and means responsive to said comparison, for if said one of said plurality of channels is not included within said plurality of channels authorized to be received, determining that use of said one of said plurality of receivers is not authorized for receipt of said one of said plurality of channels.

15. The device according to claim 14 wherein said means for determining a local oscillator frequency being utilized by said one of said plurality of receiver further comprises:

means for specifying a start frequency, a stop frequency, and a step frequency size;

means for searching each frequency beginning with said start frequency through said stop frequency in said step frequency size until an active frequency is located; and means responsive to locating an active frequency, for determining said active frequency as said local oscillator frequency.

16. The device according to claim 15 further including means for continuing to monitor said one of said plurality of receivers by continuing to search for an active frequency utilizing only said plurality of local oscillator frequencies associated with said determined type of said one of said plurality of receivers.

* * * * *